United States Patent
Chung

(10) Patent No.: US 8,199,252 B2
(45) Date of Patent: Jun. 12, 2012

(54) IMAGE-PROCESSING METHOD AND DEVICE

(75) Inventor: Chia-Hao Chung, Taoyuan (TW)

(73) Assignee: MStar Semiconductor, Inc., Hsinchu (TW)

( * ) Notice: Subject to any disclaimer, the term of this patent is extended or adjusted under 35 U.S.C. 154(b) by 1104 days.

(21) Appl. No.: 12/062,765

(22) Filed: Apr. 4, 2008

(65) Prior Publication Data

US 2008/0246885 A1    Oct. 9, 2008

Related U.S. Application Data

(60) Provisional application No. 60/909,945, filed on Apr. 4, 2007.

(51) Int. Cl.
*H04N 7/01* (2006.01)
*H04N 11/20* (2006.01)

(52) U.S. Cl. .................. 348/452; 348/448; 348/699

(58) Field of Classification Search .................. 348/452, 348/699, 448
See application file for complete search history.

(56) References Cited

U.S. PATENT DOCUMENTS

| | | | |
|---|---|---|---|
| 6,633,677 B1 * | 10/2003 | Dube et al. ................. | 382/238 |
| 2003/0174769 A1 * | 9/2003 | Nagumo et al. ......... | 375/240.02 |
| 2005/0212960 A1 * | 9/2005 | Chao ........................... | 348/448 |
| 2008/0018788 A1 * | 1/2008 | Zhou et al. .................. | 348/452 |

* cited by examiner

*Primary Examiner* — Brian Pendleton
*Assistant Examiner* — Nnenna Ekpo
(74) *Attorney, Agent, or Firm* — Kirton McConkie; Evan R. Witt

(57) ABSTRACT

The present invention relates to an image-processing method and an image-processing device. The device includes a motion estimation module, an intra-field operation module, an inter-field operation module, a weighing value generator and a blending unit. The method includes: receiving a block of an inter-frame-estimated frame and acquiring a motion vector of the block; performing a first verifying operation of the block to obtain a first verified result which indicates an adaptive level of the motion vector to the block; determining whether the block is to be divided into a plurality of sub-blocks according to the first verified result; performing a second verifying operation of the sub-block to determining an adaptive level of the motion vector to the sub-block so as to acquire a weighing value of the sub-block; and performing a de-interlacing operation of the sub-block according to the weighing value.

14 Claims, 10 Drawing Sheets

IMAGE-PROCESSING METHOD AND DEVICE

CROSS REFERENCE TO RELATED PATENT APPLICATION

This patent application claims the benefit of U.S. provisional patent application No. 60/909,945 filed Apr. 4, 2007.

FIELD OF THE INVENTION

The present invention relates to an image-processing method and an image-processing device, and more particularly to image-processing device and method for de-interlacing.

BACKGROUND OF THE INVENTION

Interlaced and non-interlaced (or progressive) image formats are two general image formats. An interlaced image can be converted into a non-interlaced image by a de-interlacing operation. As an interlaced image lacks comparable pixel data at the same pixel positions of two adjacent frames, motion estimation is developed to implement the de-interlacing operation. Motion estimation is the process of determining motion vectors that describe the transformation from one 2D image to another. For de-interlacing, motion estimation is block-based and differences among blocks are used for the estimation.

However, for some interlaced images involving special patterns, motion estimation may cause serious distortion of images. Then it is improper to implement the de-interlacing operation with motion estimation in such cases. For error protection, it is desirable to develop an image-processing method and an image-processing device which can identify such interlaced images in advance and use adaptive de-interlacing algorithms.

SUMMARY OF THE INVENTION

The present invention provides an image-processing method, which includes: receiving a block of an inter-frame-estimated frame and acquiring a motion vector of the block; performing a verifying operation of the block to obtain a first verified result which indicates an adaptive level of the motion vector to the block; determining whether the block is to be divided into a plurality of sub-blocks according to the first verified result; performing a verifying operation of the sub-block to determine an adaptive level of the motion vector to the sub-block so as to acquire a weighing value of the sub-block; and performing a de-interlacing operation of the sub-block according to the weighing value.

The present invention also provides an image-processing device for de-interlacing an interlaced field $F_n$, which includes a motion estimation module for estimating a motion vector according to three consecutive interlaced fields $F_{n-1}$, $F_n$ and $F_{n+1}$; an inter-field operation module in communication with the motion estimation module for operating the interlaced fields $F_{n-1}$ and $F_{n+1}$ and the motion vector to obtain an inter-frame-estimated frame $F_{inter}$; an intra-field operation module for operating the interlaced field $F_n$ to obtain an intra-frame-estimated frame $F_{intra}$; a weighing value generator in communication with the inter-field operation module for operating the inter-frame-estimated frame $F_{inter}$ to obtain a weighing value $\alpha$; and a blending unit in communication with the inter-field operation module, intra-field operation module and weighing value generator for blending at least one pixel of the inter-frame-estimated frame $F_{inter}$ with a corresponding pixel of the intra-frame-estimated frame $F_{intra}$ according to the weighing value $\alpha$.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

For improving accuracy of conventional motion estimation, the present invention provides a multi-directional motion estimation method. In an embodiment of the present invention, a set of three motion vectors are used for defining a candidate block. Please refer to FIGS. 1A, 1B and 1C, in which three consecutive interlaced fields 11, 12 and 13 are shown. The fields 11 and 13 are of the same parity field, while the field is of an opposite parity field. In other words, if the fields 11 and 13 are of an even field, the field 12 is of an odd field; or the fields 11 and 13 are of an odd field, and the field 12 is of an even field.

Figure 1A:
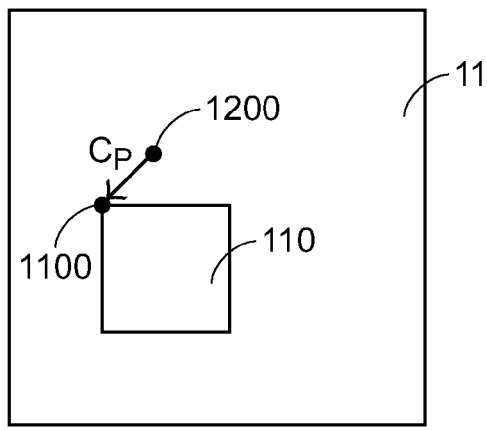
FIG. 1A~1C are schematic diagrams showing three consecutive interlaced fields involved in a motion estimation method according to an embodiment of the present invention.
Figure 1B:
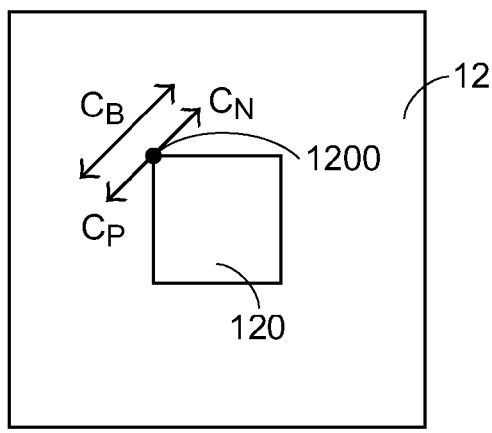

First of all, a block 120 with a preset size is specified in the current field 12 of FIG. 1B. The block 120 consists of a plurality of existing pixels and a plurality of missing pixels, which are indicated by circles and triangles in FIG. 2B, respectively. For example, when the field 12 is an interlaced field with an 800*600 pixel size, it actually includes 800*300 pixels. In this case, it is proper that the specified block 120 has a block size of 4*4, 8*8 or 16*16 pixels, wherein only 4*2, 8*4 or 16*8 pixels are actually existent and the others are missing pixels to be estimated.

On the other hand, the preceding and next interlaced fields 11 and 13 also have substantially a half of pixels missing, so interpolation is performed to estimate pixel values of the missing pixels. The interpolation in this embodiment is additionally performed by way of line averaging, i.e. estimating a pixel value of a missing pixel according to pixel values of adjacent pixels in upper and lower existing lines.

Figure 1C:
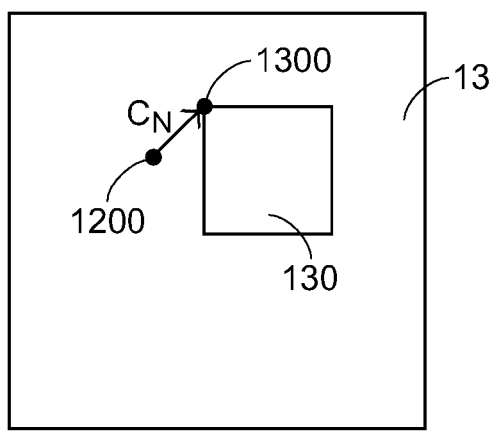

Furthermore, a plurality of sets of three motion vectors ($C_P$, $C_B$ and $C_N$) are provided, wherein $C_P$ and $C_N$ are in opposite directions and starts from an existing pixel of the field 12, while $C_B$ is parallel to $C_P$ and $C_N$ and starts from an existing pixel of the field 11 or an existing pixel of the field 13. Based on a relative position of the block 120 in the field 12, for example represented by a left upper corner pixel and indicated by a coordinate 1200, and one of the sets of motion vectors, a candidate block 110 is defined in the field 31, as shown in FIG. 1A, and a candidate block 130 is defined in the field 33, as shown in FIG. 1C. The motion vector $C_P$ points from the coordinate 1200 in the field 12 to a coordinate 1100 in the preceding field 11, thereby defining the candidate block 110. Likewise, the motion vector $C_N$ points from the coordinate 1200 in the field 12 to a coordinate 1300 in the preceding field 13, thereby defining the candidate block 130.

Figure 3:
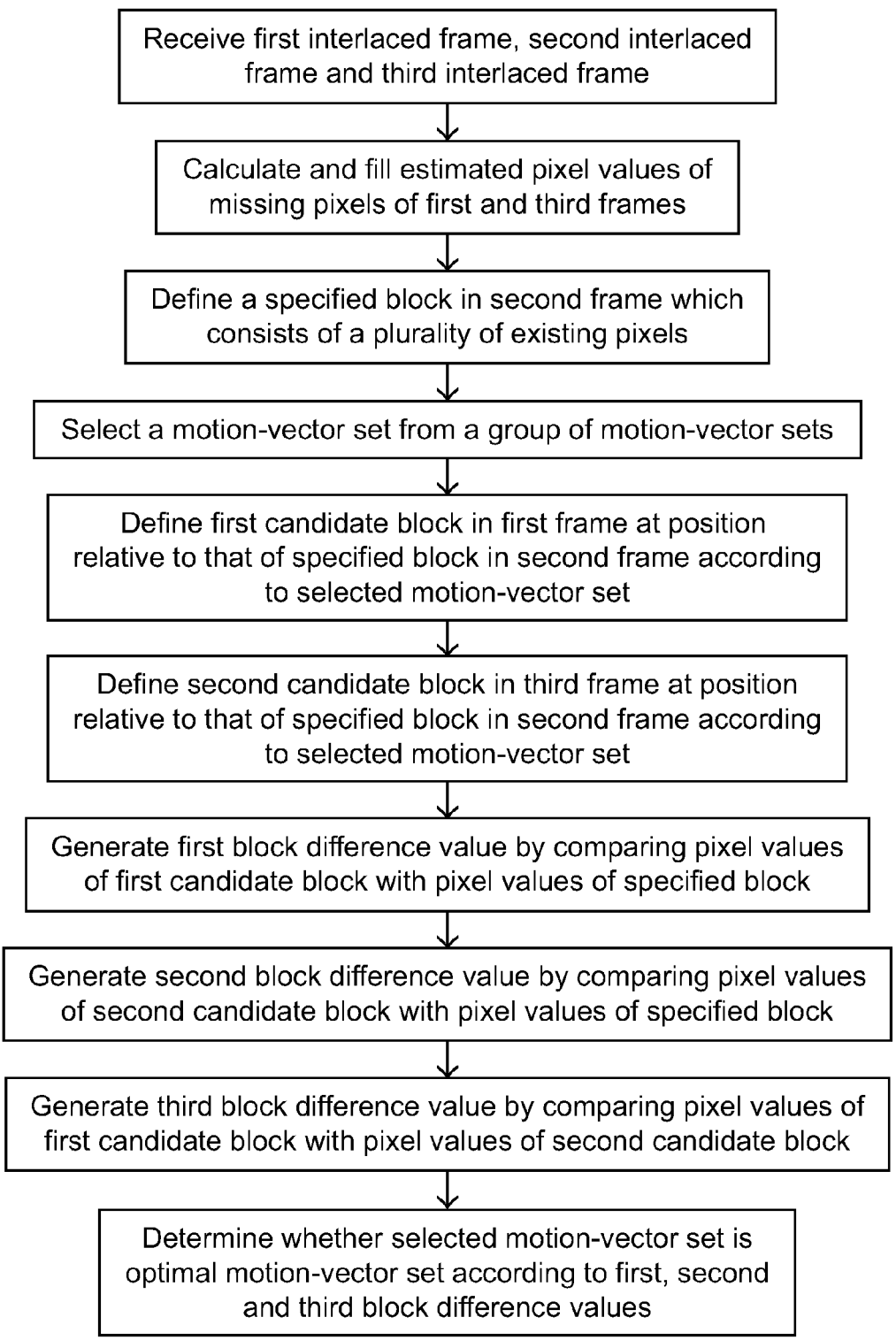
FIG. 3 is a flowchart briefly summarizing a motion estimation method according to an embodiment of the present invention.

In response to the vector $C_P$, a first block difference value is calculated by summing absolute values of the pixel difference values between existing pixels of the field 12 and corresponding pixels of the field 11. The corresponding pixels of the field 11 could be existing pixels or missing pixels with estimated pixel values, depending on the vector $C_P$. Likewise, in response to the vector $C_N$, a second block difference value is calculated by summing absolute values of the pixel difference values between existing pixels of the field 12 and corresponding pixels of the field 13. The corresponding pixels of the field 13 could be existing pixels or missing pixels with estimated pixel values, depending on the vector $C_N$. Furthermore, in response to the vector $C_B$, a third block difference value is calculated by summing absolute values of the pixel difference values between existing pixels of the field 11 and corresponding existing pixels of the field 13. The first, second and third block difference values are then summed to obtain a motion estimation value corresponding to the set of three motion vectors. In a similar manner, other motion estimation values respectively corresponding to other sets of motion vectors are calculated and compared to one another. Among them, the smallest motion estimation value is determined, and the best matching pair of blocks is thus the candidate block pair resulting in the smallest difference value, e.g. blocks 110 and 130. Accordingly, the optimal set of motion vectors $C_P$, $C_B$ and $C_N$ can be obtained. A flowchart of FIG. 3 summarizes the principal concept of the above motion estimation method.

The term "corresponding pixels" used above indicates the pixels at the same relative positions in different blocks of the same size. Any other type of correspondence can also be applied as long as the corresponding pixels are highly correlated in desired properties such as color values. In the above embodiment, all existing pixels in the specified block 120 and corresponding pixels in the candidate blocks are used for calculating the block difference values. Alternatively, it is also feasible to use one or more selected pixels only to calculate the block difference values. In addition, a set of two motion vectors can be used in lieu of the set of three motion vectors in order to simplify the calculation. The number of sets of motion vectors is also adjustable depending on practical requirements.

Figure 2A:
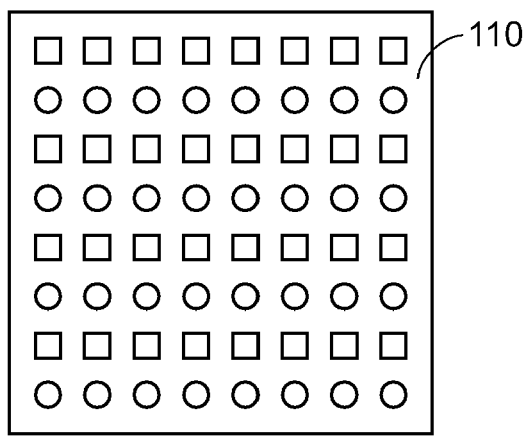
FIG. 2A~2C are schematic diagrams showing distributions of existing and missing pixels in three associated blocks involved in a motion estimation method according to an embodiment of the present invention.
Figure 2B:
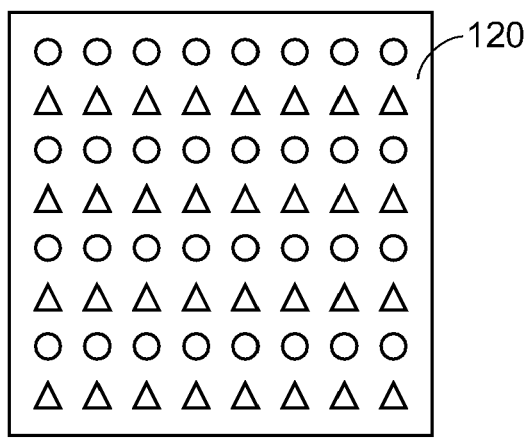
Figure 2C:
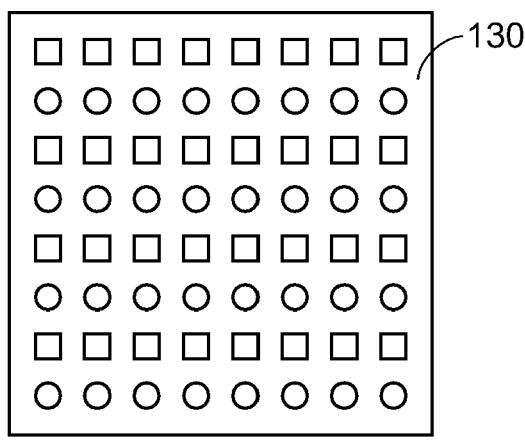

FIGS. 2A, 2B and 2C exemplify the specified block 120 and candidate blocks 110 and 130, respectively. In this example, each of the blocks has an 8*8 pixel size. The circles in each of the blocks indicate existing pixels while triangles and rectangles indicate missing pixels to be estimated. In other words, as shown, the odd lines of the candidate blocks 110 and 130 and the even lines of the specified block 120 are missing pixels. Alternatively, varying with the motion vectors, i.e. change of coordinate 1100 and/or 1300, it is possible that the odd lines of the candidate blocks 110 and 130 are existing pixels while the even lines are missing pixels. Basically, the blocks 110 and 130 change simultaneously. On the other hand, the even lines of the specified block 120 can be existing pixels while the odd lines can be missing pixels once the specified block (or coordinate 1200) changes.

Although an interlaced field can be precisely de-interlaced by finding an optimal motion vector set as mentioned above, the de-interlacing operation can be further improved in some special cases. For example, in an embodiment of the present invention, three consecutive interlaced fields of a video signal are involved for estimating pixel values of missing pixels of a current interlaced field. However, if the video signal includes a motion object that appears in the first interlaced field and the second interlaced field but disappears from the third interlaced field, or the motion object is not present in the first interlaced field but appears in the second and third interlaced fields, the motion estimation involving all the three interlaced fields would become impractical enough.

Figure 4:
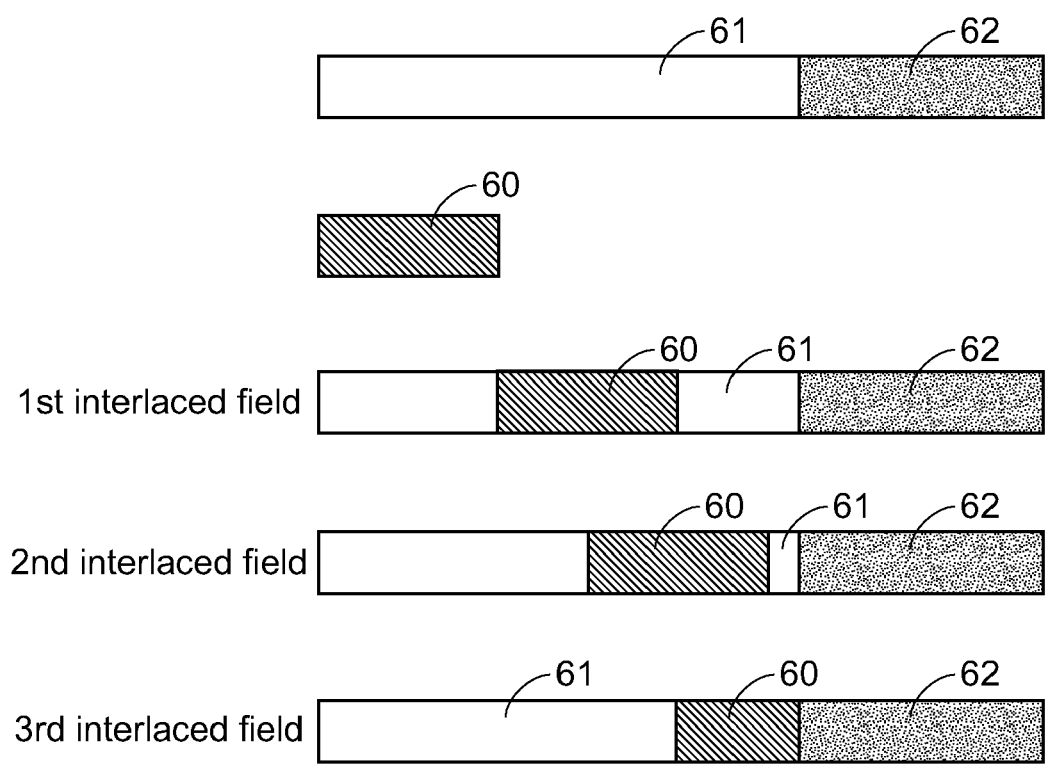
FIG. 4 is a scheme illustrating a case in which error may happen due to a totally or partially hidden object.

FIG. 4 illustrates another case in which errors may happen. As shown, a motion object 60 moves relative to a background 61, and thus exists at different positions of the first interlaced field and the second interlaced field but is partially hidden from a static object 62 in the third interlaced field. Under this circumstance, the optimal motion vector set determined according to the above-mentioned motion estimation method is used as a provisionally optimal motion vector set which requires modification. Since the motion object 60 is only partially shown in the third interlaced field, the first block difference value calculated in response to the vector $C_P$ by summing absolute values of the pixel difference values between existing pixels of the second interlaced field and corresponding pixels of the first interlaced field is much smaller than the second block difference value calculated in response to the vector $C_N$ by summing absolute values of the pixel difference values between existing pixels of the second interlaced field and corresponding pixels of the third interlaced field and the third block difference value calculated in response to the vector $C_B$ by summing absolute values of the pixel difference values between existing pixels of the first interlaced field and corresponding existing pixels of the third interlaced field. In a further embodiment of the present invention, for alleviating the adverse effect of the second and third block difference values, the first block difference value is solely used as the motion estimation value, and an optimal motion vector $C_P$ can be determined by acquiring and comparing a plurality of motion estimation values corresponding to a variety of preset motion vectors $C_P$. The motion vector resulting in the smallest motion estimation value is determined as the optimal motion vector $C_P$.

In contrast, if the motion object 60 does not exist in the first interlaced field but exists at different positions of the second interlaced field and the third interlaced field, the second block difference value will be much smaller than the first block difference value and the third block difference value. Therefore, it is preferred that the second block difference value is solely used as the motion estimation value, and an optimal motion vector $C_B$ can be determined by acquiring and comparing a plurality of motion estimation values corresponding to a variety of preset motion vector $C_B$. The motion vector resulting in the smallest motion estimation value is determined as the optimal motion vector $C_B$.

Figure 5:
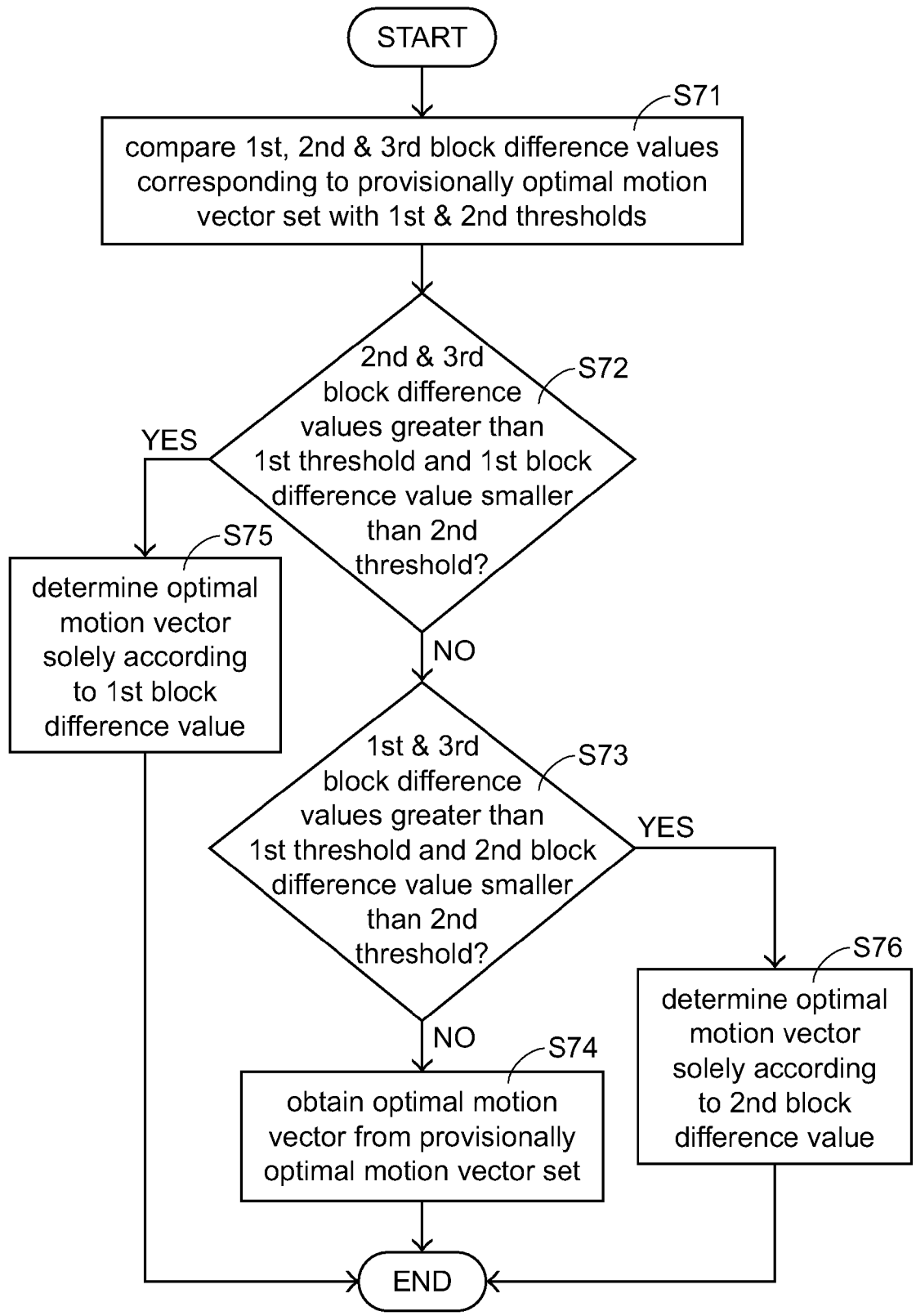
FIG. 5 is a flowchart summarizing a motion estimation method according to another embodiment of the present invention.

A flowchart of FIG. 5 summarizes the modified motion estimation method. First of all, the first, second and third block difference values corresponding to the provisionally optimal motion vector set are compared with a first threshold and a second threshold that is lower than the first threshold (Step S71). If the second and third block difference values are greater than the first threshold and the first block difference value is smaller than the second threshold (Step S72), an optimal motion vector is determined solely according to the first block difference value (Step S75). Otherwise, check if the first and third block difference values are greater than the first threshold and the second block difference value is smaller than the second threshold (Step S73). If positive, determine an optimal motion vector solely according to the second block difference value (Step S74). Otherwise, confirm the provisionally optimal motion vector set to be the optimal motion vector set, and obtain an optimal motion vector for subsequent operations from the optimal motion vector set.

To sum up, the motion estimation method according to the present invention is particularly designed to find the best matching block or block pair. By changing the sizes and/or directions of the predetermined motion-vector sets to define a plurality of candidate blocks, a plurality of block difference values can be obtained. One of the plurality of block difference values, e.g. the smallest one, is selected, and the motion-vector set corresponding to the selected block difference value is then determined as the optimal motion vector set. Since the current field and the preceding and next fields are all referred to when determining the optimal motion vector set, the de-interlacing process can be performed with improved precision. Furthermore, by using the spatial line-averaging method, instead of temporally de-interlacing method, to estimate the missing pixels of the preceding and next fields, error propagation can be avoided. Furthermore, by setting thresholds for the block difference values to modify the motion estimation method, the de-interlacing effect for special cases can be further improved.

After the optimal motion vector is obtained, an image-processing operation can be performed with the optimal motion vector for high-quality de-interlacing.

Figure 6A:
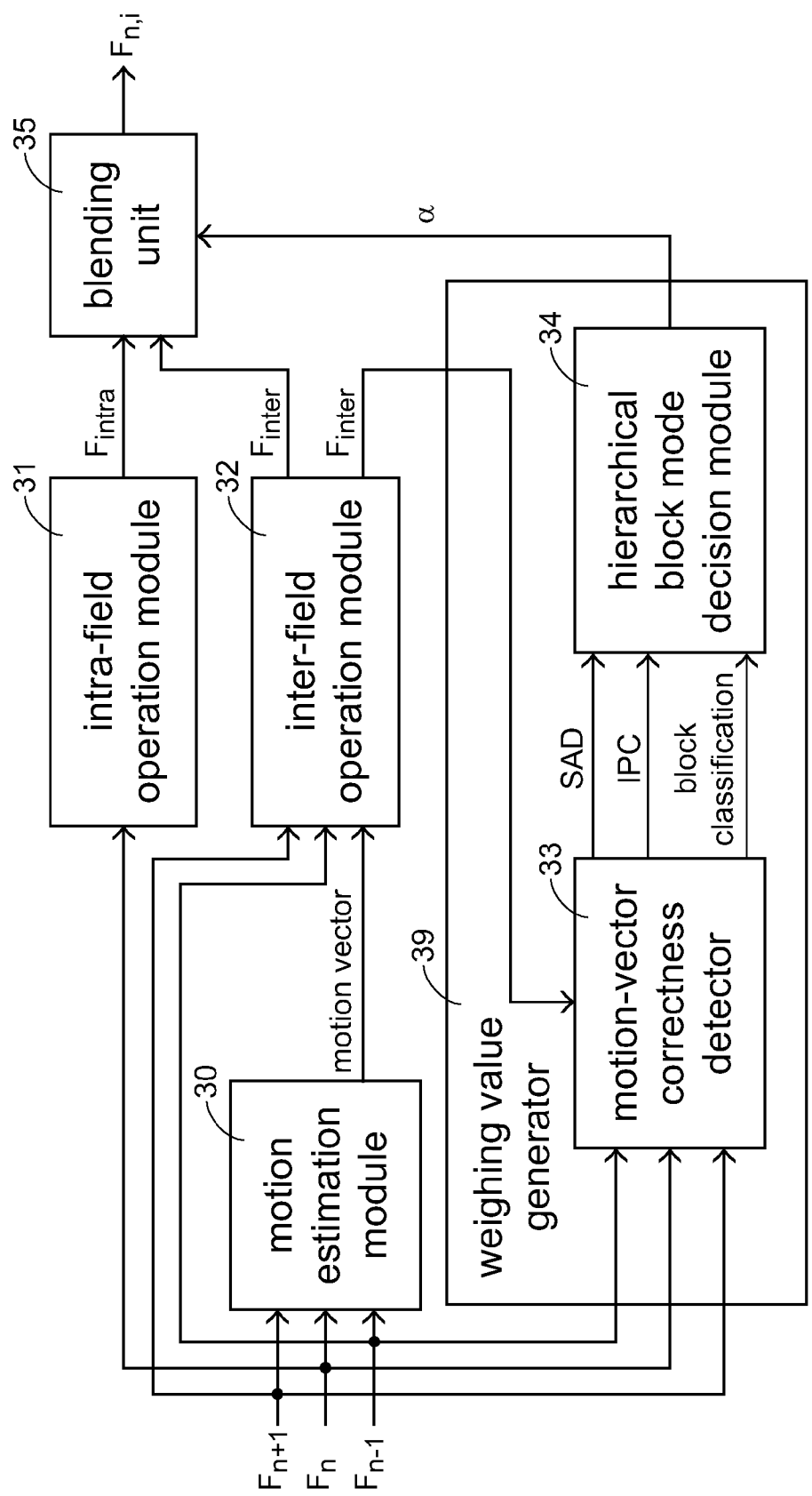
FIG. 6A is a functional block diagram illustrating an image-processing device according to an embodiment of the present invention.

An image-processing device for performing the image-processing operation according to an embodiment of the present invention will be illustrated herein with reference to the functional block diagram of FIG. 6A. In this embodiment, the image-processing device is used in an image-processing chip to execute a de-interlacing operation. The image-processing device includes a motion estimation module 30, an intra-field operation module 31, an inter-field operation module 32, a blending unit 35 and a weighing value generator 39. The motion estimation module 30 receives three consecutive interlaced fields $F_{n-1}$, $F_n$ and $F_{n+1}$ and performs an estimating operation of a motion vector accordingly. Although it is preferred to use the above-mentioned technique to acquire the motion vector, the motion vector can also be obtained by any other suitable technique conventionally used or newly developed in the art. Alternatively, less or more than three interlaced fields can be used to estimate the motion vector, depending on respective designs.

The acquired motion vector is then sent to the inter-field operation module 32 which estimates inter-frame-estimated frame $F_{inter}$ according to the pixel data of the interlaced fields $F_{n-1}$ and $F_{n+1}$ and the motion vector. On the other hand, the intra-field operation module 31 is used to estimate intra-frame-estimated frame $F_{intra}$ according to the pixel data in the interlaced field $F_n$ itself. The inter-field and intra-field operations, for example, can be implemented with inter-field and intra-field interpolation.

The blending unit 35 synthesizes corresponding pixels of the inter-frame-estimated frame $F_{inter}$ and the intra-frame-estimated frame $F_{intra}$ according to a weighing value α, which lies between 0 and 1 ($0 \leq \alpha \leq 1$) thereby obtaining the missing pixel data of the interlaced frame $F_n$ and accomplishing the de-interlacing operation. For example, the pixel data of the missing pixels are calculated with the formula $F_{n,i} = \alpha \times F_{intra} + (1-\alpha) \times F_{inter}$. The weighing value α is generated by the weighing value generator 39 which further includes a motion-vector correctness detector 33 and a hierarchical block mode decision module 34.

The motion-vector correctness detector 33 calculates a sum of absolute difference (SAD), an interlaced pixel count (IPC) and a block classification value according to the interlaced fields $F_{n-1}$, $F_n$, $F_{n+1}$ and the inter-frame-estimated frame $F_{inter}$. The sum of absolute difference (SAD) is obtained by taking the absolute value of the difference between each pixel in the original block and the corresponding pixel in the block being used for comparison and summing the differences to create a simple metric of block similarity. The interlaced pixel count (IPC) is a value indicating a number of unreliable interpolated pixels in a specified block. The calculation of these values will be described in more detail later. The hierarchical block mode decision module 34 then determines a weighing value α of each pixel to be de-interlaced according to these three values. The weighing value α provides an indication of adaptivity of the motion vector corresponding to the pixel to be de-interlaced.

Figure 6B:
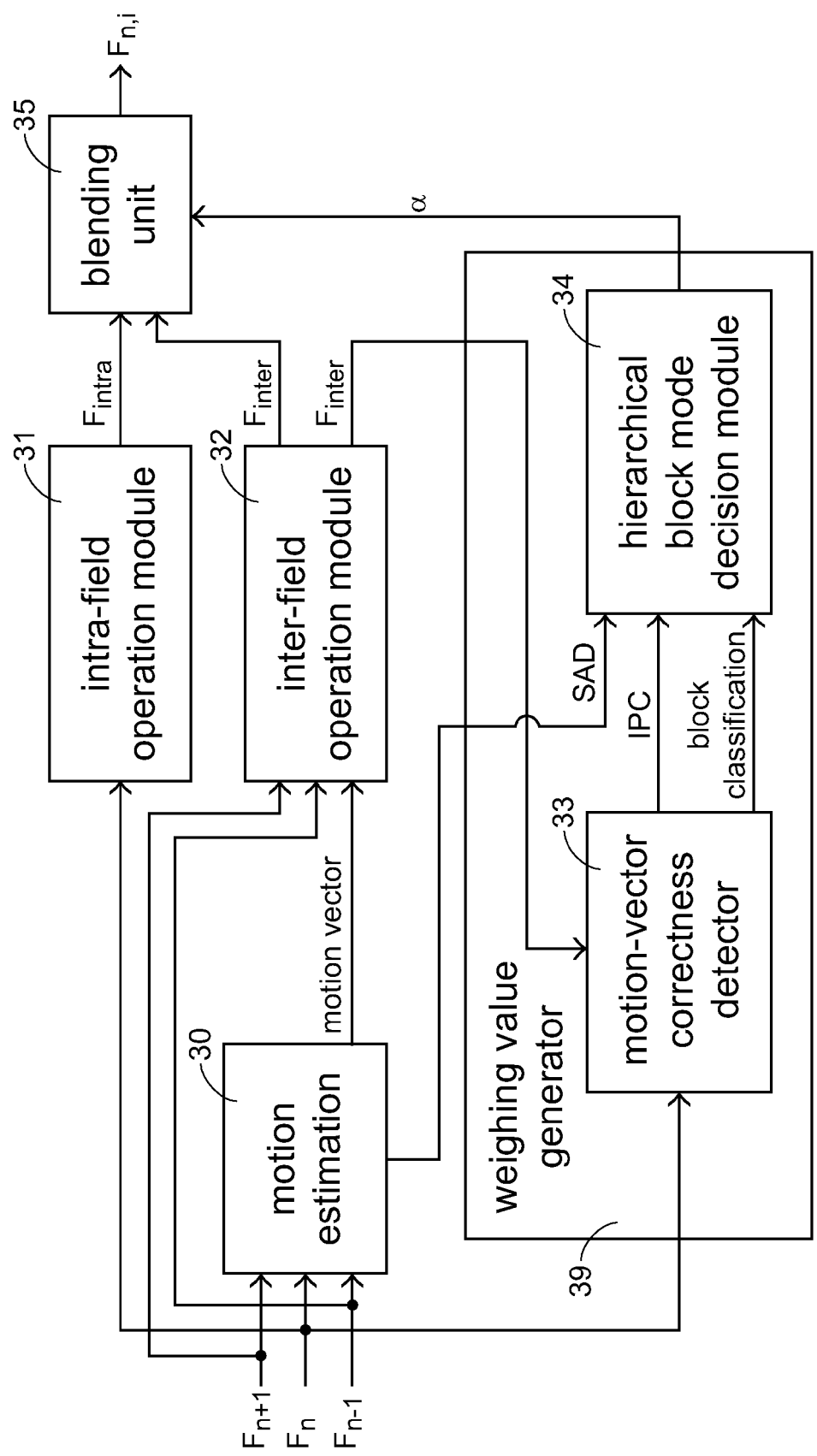
FIG. 6B is a functional block diagram illustrating an image-processing device according to another embodiment of the present invention.

An image-processing device according to another embodiment of the present invention is illustrated in FIG. 6B. Since a SAD value can also be obtained by the motion estimation module 30 while estimating the motion vector, the motion-vector correctness detector 33 does not calculate the SAD value in this embodiment. Instead, the SAD value is provided for the hierarchical block mode decision module 34 by the motion estimation module 30.

Figure 7:
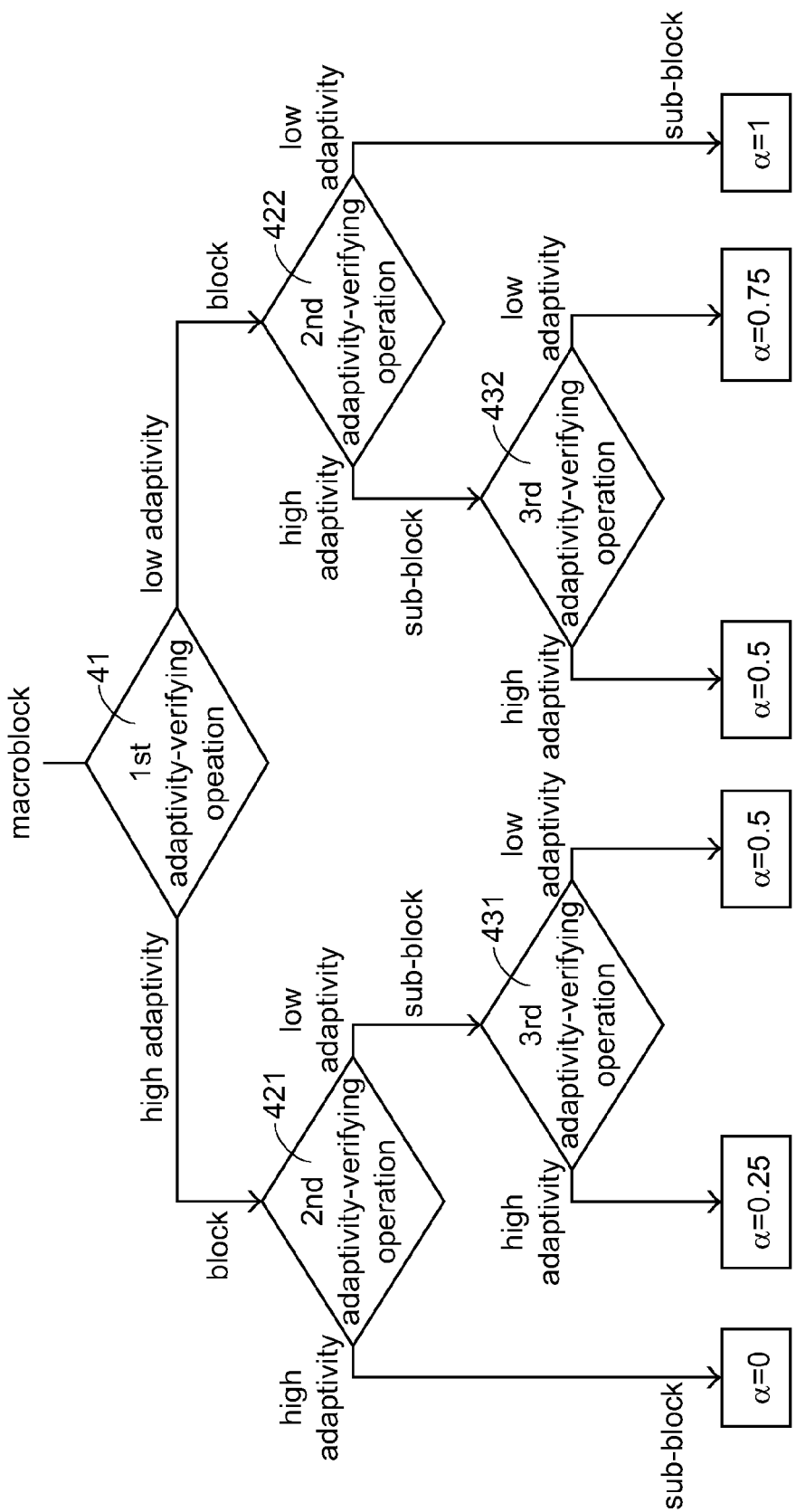
FIG. 7 is a flowchart illustrating an image-processing method according to an embodiment of the present invention.

Please refer to FIG. 7 which exemplifies the determination of a weighing value α to be inputted into the blending unit 35 for calculating the pixel data of the missing pixels Fn,i. First of all, an interlaced field $F_n$ is divided into a plurality of rectangular blocks, e.g. macroblocks (MB) each consisting of 16*16 pixels. Then each single macroblock is verified through a series of criteria. A first verifying operation is first performed in Step 41 to classify each macroblock as a macroblock with "high adaptivity" or "low adaptivity". Then a second verifying operation is performed in Step 421 for classifying each block (e.g. each consisting of 8*8 pixels) included in the "high adaptivity" macroblock as a block with "high adaptivity" or "low adaptivity". Meanwhile, the second verifying operation is also performed in Step 422 for classifying each block included in the "low adaptivity" macroblock as a block with "high adaptivity" or "low adaptivity". Likewise, a third verifying operation is performed in Step 431 and Step 432 for classifying each sub-block (e.g. each consisting of 4*4 pixels) included in the "low adaptivity" block determined in Step 421 and each sub-block included in the "high adaptivity" block determined in Step 422, respectively, as a sub-block with "high adaptivity" or "low adaptivity".

When a sub-block is classified to be with "high adaptivity" on the condition of "high adaptivity" block and "high adaptivity" macroblock, it means the motion vector for motion compensation is reliable. Thus the weighing value α is made minimal, e.g. 0. In contrast, when a sub-block is classified to be with "low adaptivity" on the condition of "low adaptivity"

block and "low adaptivity" macroblock, it means the motion vector for motion compensation is extremely unreliable. Thus the weighing value a is made maximal, e.g. 1. The larger weighing value of a sub-block indicates lower adaptivity of inter-frame-estimated frame $F_{inter}$ but higher adaptivity of intra-frame-estimated frame $F_{intra}$ for de-interlacing the sub-block. In the example as shown in FIG. 7, the sub-block with "high adaptivity" on the condition of "high adaptivity" block and "high adaptivity" macroblock is defined with a weighing value α=0; the sub-block with "high adaptivity" on the condition of "high adaptivity" block and "high adaptivity" macroblock is defined with a weighing value α=0; the sub-block with "high adaptivity" on the condition of "low adaptivity" block but "high adaptivity" macroblock is defined with a weighing value α=0.25; the sub-block with "low adaptivity" on the condition of "low adaptivity" block but "high adaptivity" macroblock is defined with a weighing value α=0.5; the sub-block with "high adaptivity" on the condition of "high adaptivity" block but "low adaptivity" macroblock is defined with a weighing value α=0.5; the sub-block with "low adaptivity" on the condition of "high adaptivity" block but "low adaptivity" macroblock is defined with a weighing value α=0.75; and the sub-block with "low adaptivity" on the condition of "low adaptivity" block and "low adaptivity" macroblock is defined with a weighing value α=1.

Although three levels of block sizes are exemplified above, more levels resulting from further divided blocks consisting of 2*2 pixels or even 1*1 pixel can be applied for defining the weighing value more accurately and thus further enhancing the quality of de-interlaced image. Furthermore, although two-phase adaptivities, i.e. high and low, are illustrated in the embodiment of FIG. 7, more than two phases of adaptivities, e.g. high, middle and low, can also be used for the discrimination.

Basically but not necessarily, the first verifying operation 41, the second verifying operation 42 and the third verifying operation 43 are performed in the same way, although the block sizes to be processed are different. The first verifying operation 41, the second verifying operation 42 and the third verifying operation 43 are performed based on the SAD, IPC and block classification values as mentioned above with reference to FIG. 1A or 1B and proper thresholds. Preferably but not necessarily, the thresholds used in the first, second and third verifying operations for verifying the adaptivity of a macroblock, a block and a sub-block are differentially set in order to have better performance.

Figure 8:
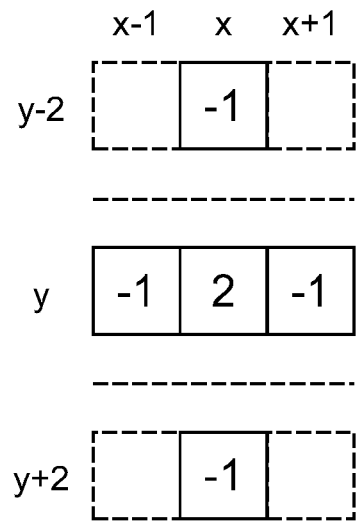
FIG. 8 is a diagram schematically showing associated pixels around a pixel f(x,y,n) in the same parity field, wherein the pixel data are used to determine features of blocks according to an embodiment of the present invention.

For obtaining a block classification value, the motion-vector correctness detector 33 first classifies each pixel in the interlaced field $F_n$. For example, data of upper and lower pixels f(x,y−2,n) and f(x,y+2,n) and left and right pixels f(x−1,y,n) and f(x+1,y,n) around a pixel f(x,y,n) in the same field, as shown in FIG. 8, are operated with high-pass filtering to obtain parameters $D_v$ and $D_h$, where $$D_v=|-f(x,y-2,n)+2f(x,y,n)-f(x,y+2,n)|; \text{ and}$$

$$D_h=|-f(x-1,y,n)+2f(x,y,n)-f(x+1,y,n)|.$$

The parameters $D_v$ and $D_h$ are compared with thresholds $T_v$ and $T_h$. If $D_v<T_v$, the pixel f(x,y,n) is determined to be in a smooth or vertical edge area; if $D_v>T_v$ and $D_h<T_h$, the pixel f(x,y,n) is determined to be in a horizontal edge area; and if $D_v>T_v$ and $D_h>T_h$, the pixel f(x,y,n) is determined to be in an oblique edge area or texture region.

After each pixel in a block is classified, the block can be classified accordingly. For example, if a count of the pixels which are determined to be in an oblique edge area or texture region in the block is greater than a threshold $TH_T$, the block is defined as a texture block; if the above condition is not complied with, and a count of the pixels which are determined to be in a horizontal edge area in the block is greater than a threshold $TH_H$, the block is defined as a horizontal edge block; and if both the above conditions are not complied with, the block is classified as one of a texture block, a horizontal edge block and a smooth or vertical edge block according to the pixels with the greatest count among the three kinds of pixels. In similar ways, blocks with various sizes, e.g. macroblocks, blocks or sub-blocks, can be classified. The thresholds $TH_T$ and $TH_H$ are preset and preferably vary with block sizes.

Figure 9:
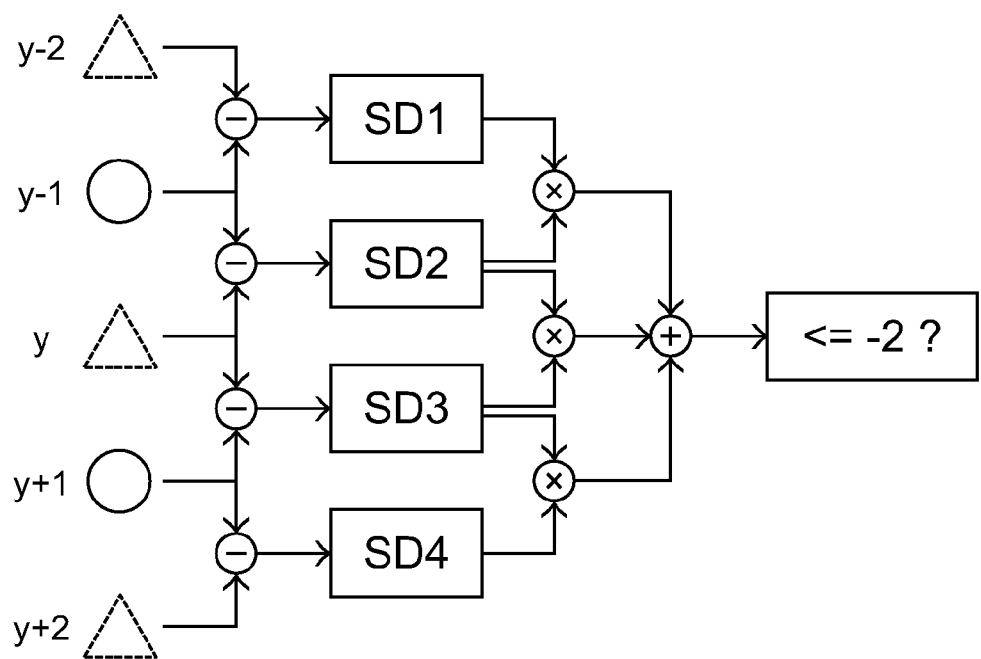
FIG. 9 is a scheme illustrating the detection of unreliable interpolated pixels according to an embodiment of the present invention.

Afterwards, the acquisition of IPC value is described with reference to FIG. 9. Difference values between pairs of adjacent two of the interpolated pixel f(x,y,n) and its neighbor pixels f(x,y−2,n), f(x,y+2,n), f(x−1,y,n) and f(x+1,y,n) in an inter-frame-estimated frame $F_{inter}$ are inputted into the first, second, third and fourth operating units SD1, SD2, SD3 and SD4, respectively. The operating units SD1, SD2, SD3 and SD4 outputs one of the values 1, 0 and −1 accordingly. For example, if the inputted difference value is greater than a threshold, the value "1" is outputted; if the inputted difference value is less than a minus value of the threshold, the value "−1" is outputted; and otherwise, the value "0" is outputted. The outputs of adjacent two of the operating units SD1, SD2, SD3 and SD4 are multiplied so as to obtain three products which are further added to obtain an index value. If the index value is less than or equal to "−2", i.e. (SD1×SD2+SD2×SD3+SD3×SD4)≦−2, it shows that the pixel f(x,y,n) involves in high frequency slop transition in a vertical direction because the outputs of the operating units SD1, SD2, SD3 and SD4 are likely "1", "−1", "1", "−1", respectively. In this case, the interpolated pixel is less correlated to the primitive pixel. The IPC value of a block is then a count of pixels less correlated to the primitive pixels in the block. In similar ways, IPC values of blocks with various sizes, e.g. macroblocks, blocks or sub-blocks, can be obtained.

As for the SAD value, it can be obtained by a method described above. Alternatively, any other suitable methods can also be used. In similar ways, SAD values of blocks with various sizes, e.g. macroblocks, blocks or sub-blocks, can be obtained.

Figure 10:
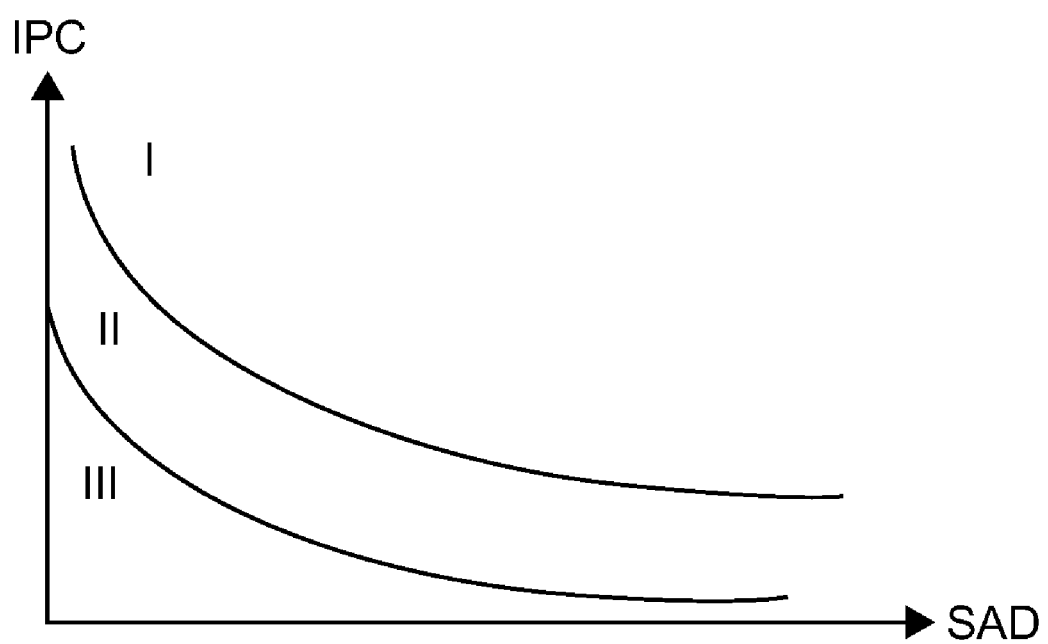
FIG. 10 is an IPC vs. SAD plot schematically showing three coordinate zones for classifying blocks.

It is understood that the three kinds of blocks discussed in the above embodiments have different features. Therefore, it is preferred to use different criteria to verify associated adaptivities. For example, for a macroblock consisting of 16*16 pixels, three verifying criteria are set according to the block classification, i.e. texture block, horizontal edge block or smooth or vertical edge block. The macroblock is then verified accordingly in a way previously described with reference to FIG. 8. In response to the block classification value, a further verifying criterion involving a plurality of PC thresholds and SAD thresholds is set. When building an IPC vs. SAD plot, as exemplified in FIG. 10, three zones I, II and III are defined in the coordinate system according to the IPC thresholds and the SAD thresholds. By locating the SAD value and IPC value of a block in the coordinate system, the adaptivity of a motion vector of the block can be determined. For example, if the SAD value and IPC value of a block lies in Zone III, the block will be defined with higher adaptivity; in contrast, the SAD value and IPC value lying in Zone I indicate lower adaptivity; and the SAD value and IPC value lying in Zone II indicate an adaptivity level higher than those in Zone I but lower than those in Zone III. Different IPC vs. SAD plots are used for determining adaptivity of different kinds of blocks. Likewise, different IPC and SAD thresholds are set for determining adaptivity of different sizes of blocks.

To sum up, the present invention takes a variety of block features into consideration so as to provide adaptive de-interlacing, operations. Accordingly, error protection for motion estimation can be achieved.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image-processing method, comprising:
   receiving a block of an inter-frame-estimated frame and acquiring a motion vector of the block;
   performing a verifying operation of the block to obtain a first verified result which indicates an adaptive level of the motion vector to the block;
   determining whether the block is to be divided into a plurality of sub-blocks according to the first verified result;
   performing a verifying operation of the sub-block to determine an adaptive level of the motion vector to the sub-block so as to acquire a weighing value of the sub-block; and
   performing a de-interlacing operation of the sub-block according to the weighing value;
   wherein the verifying operation comprises defining a plurality of block types, and the defining step comprises:
   classifying a pixel f(x,y,n) in the block or the sub-block as a texture pixel, a horizontal edge pixel or a smooth or vertical edge pixel, the classifying step comprising:
      performing high-pass filtering with neighbor pixels f(x,y−2,n), f(x,y+2,n), f(x−1,y,n) and f(x+1,y,n) around the pixel f(x,y,n) in the same field to obtain parameters $D_v$ and $D_h$;
      comparing the parameters Dv and Dh with two thresholds Tv and Th, respectively;
      when Dv<Tv, determining the pixel f(x,y,n) as the smooth or vertical edge pixel;
      when Dv>Tv and Dh<Th, determining the pixel f(x,y,n) as the horizontal edge pixel; and
      when Dv>Tv and Dh>Th, determining the pixel f(x,y,n) as the texture pixel.

2. The image-processing method according to claim 1 further comprising:
   receiving a macroblock of the inter-frame-estimated frame, the macroblock having a motion vector;
   performing a verifying operation of the macroblock to obtain a third verified result which indicates an adaptive level of the motion vector of the macroblock to the macroblock; and
   determining whether the macroblock is to be divided into a plurality of blocks including the block according to the third verified result.

3. The image-processing method according to claim 2 wherein the verifying operations of the macroblock comprises the steps of:
   defining a plurality of block types and presetting a plurality of verifying criteria corresponding to the block types;
   determining respective block types and corresponding verifying criteria of the macroblock; and
   determining respective adaptive levels of the motion vectors to the macroblock.

4. The image-processing method according to claim 3 wherein the block types comprise a texture block, a horizontal edge block and a smooth or vertical edge block, and the defining step of block types comprises steps of:
   receiving the macroblock;
   classifying each pixel in the macroblock as a texture pixel, a horizontal edge pixel or a smooth or vertical edge pixel;
   counting respective counts of the texture pixels, the horizontal edge pixels and/or the smooth or vertical edge pixels in the same macroblock, block or sub-block;
   defining the macroblock to be the texture block if the count of texture pixels in the same macroblock is greater than a first threshold;
   defining the macroblock to be the horizontal edge block if the count of texture pixels in the same macroblock is not greater than the first threshold, but the count of horizontal edge pixels in the same macroblock is greater than a second threshold; and
   defining the macroblock to be one of the texture block, horizontal edge block and smooth or vertical edge block corresponding to the largest count of pixels among texture pixels, horizontal edge pixels and smooth or vertical edge pixels if the count of texture pixels in the same macroblock is not greater than the first threshold, and the count of horizontal edge pixels in the same macroblock is not greater than the second threshold.

5. The image-processing method according to claim 4 wherein the classifying step of a pixel f(x,y,n) in the macroblock comprises steps of:
   performing high-pass filtering with neighbor pixels f(x,y−2,n), f(x,y+2,n), f(x−1,y,n) and f(x+1,y,n) around the pixel f(x,y,n) in the same field to obtain parameters $D_v$ and $D_h$; and comparing the parameters $D_v$ and $D_h$ with two thresholds $T_v$ and $T_h$, respectively;
   wherein if $D_v<T_v$, the pixel f(x,y,n) is determined as a smooth or vertical edge pixel; if $D_v>T_v$ and $D_h<T_h$, the pixel f(x,y,n) is determined as a horizontal edge pixel; and if $D_v>T_v$ and $D_h>T_h$, the pixel f(x,y,n) is determined as a texture pixel.

6. The image-processing method according to claim 5 wherein in the macroblock, the block or the sub-block, the following formulae are complied with:

$$D_v=|-f(x,y-2,n)+2f(x,y,n)-f(x,y+2,n)|; \text{ and}$$

$$D_h=|-f(x-1,y,n)+2f(x,y,n)-f(x+1,y,n)|.$$

7. The image-processing method according to claim 3 wherein the verifying operation of the macroblock, block or sub-block comprises:
   presetting an interlaced pixel count threshold;
   lowering the adaptivity level of the motion vector to the macroblock, the block or the sub-block when an interlaced pixel count value of the macroblock, the block or the sub-block is greater than the interlaced pixel count threshold; and
   promoting the adaptivity level of the motion vector to the macroblock, the block or the sub-block when an interlaced pixel count value of the macroblock, the block or the sub-block is not greater than the interlaced pixel count threshold.

8. The image-processing method according to claim 7 wherein the interlaced pixel count value is calculated by:
   calculating difference values between pairs of adjacent two of the pixel f(x,y,n) and the neighbor pixels f(x,y−2,n), f(x,y+2,n), f(x−1,y,n) and f(x+1,y,n) in an inter-frame-estimated frame $F_{inter}$;
   comparing each of the difference values with a difference threshold to selectively output a value "1", "0" or "−1", wherein the value "1" is outputted when the difference value is greater than the difference threshold; the value "−1" is outputted when the difference value is less than a minus value of the difference threshold; and otherwise the value "0" is outputted;

performing multiplying operations of pairs of adjacent two of the outputted values to output a plurality of products;

defining the pixel f(x,y,n) as an unreliable interpolated pixel if a sum of the plurality of products does not exceed a preset threshold; and determining the interlaced pixel count value of the macroblock, block or sub-block as a count of unreliable interpolated pixels in the macroblock, block or sub-block.

9. An image-processing device for de-interlacing an interlaced field $F_n$, comprising:

a motion estimation module for estimating a motion vector according to three consecutive interlaced fields $F_{n-1}$, $F_n$ and $F_{n+1}$;

an inter-field operation module in communication with the motion estimation module for operating the interlaced fields $F_{n-1}$ and $F_{n+1}$ and the motion vector to obtain an inter-frame-estimated frame $F_{inter}$;

an intra-field operation module for operating the interlaced field $F_n$ to obtain an intra-frame-estimated frame $F_{intra}$;

a weighing value generator in communication with the inter-field operation module for operating the inter-frame-estimated frame $F_{inter}$ to obtain a weighing value α; and a blending unit in communication with the inter-field operation module, intra-field operation module and weighing value generator for blending at least one pixel of the inter-frame-estimated frame $F_{inter}$ with a corresponding pixel of the intra-frame-estimated frame $F_{intra}$ according to the weighing value α;

wherein the weighing value generator comprises:

a motion-vector correctness detector for providing a block feature of a macroblock of the interlaced field $F_n$ according to the inter-frame-estimated frame $F_{inter}$, the interlaced field $F_n$ and the motion vector, the motion-vector correctness detector comprising a first operating unit SD1, a second operating unit SD2, a third operating unit SD3 and a fourth operating unit SD4, and performing operations of:

calculating difference values between pairs of adjacent two of the pixel f(x,y,n) and neighbor pixels f(x,y−2,n), f(x,y+2,n), f(x−1,y,n) and f(x+1,y,n) in an inter-frame-estimated frame $F_{inter}$;

comparing each of the difference values with a difference threshold to selectively output a value "1", "0" or "−1", wherein the value "1" is outputted when the difference value is greater than the difference threshold; the value "−1" is outputted when the difference value is less than a minus value of the difference threshold; and otherwise the value "0" is outputted;

performing multiplying operations of pairs of adjacent two of the outputted values to output a plurality of products;

defining the pixel f(x,y,n) as an unreliable interpolated pixel if a sum of the plurality of products does not exceed "−2"; and determining the interlaced pixel count value of the macroblock, the block or a sub-block as a count of unreliable interpolated pixels in the macroblock, the block or the sub-block.

10. The image-processing device according to claim 9 wherein the weighing value generator further comprises:

a hierarchical block mode decision module in communication with the motion-vector correctness detector and the blending unit for determining the weighing value α according to the block feature.

11. The image-processing device according to claim 10 wherein the hierarchical block mode decision module performs operations of:

defining the block in the inter-frame-estimated frame $F_{inter}$;

performing a verifying operation of the block to obtain a first verified result which indicates an adaptive level of the motion vector to the block;

determining whether the block is to be divided into a plurality of sub-blocks according to the first verified result;

performing a verifying operation of the sub-block to determine an adaptive level of the motion vector to the sub-block so as to acquire a weighing value of the sub-block; and performing a de-interlacing operation of the sub-block according to the weighing value.

12. The image-processing device according to claim 11 wherein the hierarchical block mode decision module further performs operations of:

receiving the macroblock of the inter-frame-estimated frame, the macroblock having a motion vector;

performing a verifying operation of the macroblock to obtain a third verified result which indicates an adaptive level of the motion vector of the macroblock to the macroblock; and determining whether the macroblock is to be divided into a plurality of blocks including the block according to the third verified result.

13. The image-processing device according to claim 10 wherein the block feature comprises at least a sum of absolute values and/or a reliable level of an interpolated pixel corresponding to the macroblock.

14. The image-processing device according to claim 9 wherein the de-interlacing operation is performed by blending the inter-frame-estimated frame $F_{inter}$ with the intra-frame-estimated frame $F_{intra}$ according to the weighing value α.

* * * * *